US012186722B2

(12) United States Patent
Even

(10) Patent No.: US 12,186,722 B2
(45) Date of Patent: Jan. 7, 2025

(54) POROUS POLYSILOXANE MICROSPHERES

(71) Applicant: Honeywell Federal Manufacturing & Technologies, LLC, Kansas City, MO (US)

(72) Inventor: Dakota Even, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 566 days.

(21) Appl. No.: 17/665,763

(22) Filed: Feb. 7, 2022

(65) Prior Publication Data
US 2023/0249149 A1 Aug. 10, 2023

(51) Int. Cl.
*B01J 13/16* (2006.01)
*B41M 5/00* (2006.01)
*C08G 77/08* (2006.01)
*C08G 77/12* (2006.01)
*C08G 77/20* (2006.01)
*C09D 11/102* (2014.01)

(52) U.S. Cl.
CPC ............ *B01J 13/16* (2013.01); *B41M 5/0023* (2013.01); *C08G 77/08* (2013.01); *C08G 77/12* (2013.01); *C08G 77/20* (2013.01); *C09D 11/102* (2013.01)

(58) Field of Classification Search
None
See application file for complete search history.

(56) References Cited

U.S. PATENT DOCUMENTS

| 9,457,333 | B2 | 10/2016 | Kwon et al. |
| 10,300,019 | B2 | 5/2019 | Steendam et al. |
| 10,662,470 | B2 | 5/2020 | Arab et al. |
| 2020/0315975 | A1* | 10/2020 | Loeb .................... A61K 9/4858 |

FOREIGN PATENT DOCUMENTS

CN     111234231 A  * 6/2020

OTHER PUBLICATIONS

National Library of Medicine; National Center for Biotechnology Information; article titled: Hydrophilic microspheres from water-in-oil emulsions by the water diffusion technique (Paper by Trotta et al.); webpage: https://pubmed.ncbi.nlm.nih.gov/15359580/.

* cited by examiner

*Primary Examiner* — Richard A. Huhn
(74) *Attorney, Agent, or Firm* — Hovey Williams LLP

(57) ABSTRACT

Porous polysiloxane microspheres may be formed using a double emulsion (W/O/W) and double reaction process. The methods generally comprise forming a first emulsion and reacting components of the emulsion phases to form reinforced hydrogen gas pockets. The first emulsion is then combined with a solvent to form a second emulsion comprising a plurality of microspheres making up the dispersed phase. The microspheres comprise the reinforced gas pockets encapsulated by a polysiloxane, which are cured and recovered. The microspheres are particularly useful as fillers for low density composite materials and sensor applications.

20 Claims, 8 Drawing Sheets

POROUS POLYSILOXANE MICROSPHERES

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

BACKGROUND OF THE INVENTION

Field of the Invention

The present invention relates to methods of forming porous polysiloxane microspheres using a double emulsion process and the porous microspheres resulting therefrom. The microspheres are particularly useful as fillers for low density composite materials and sensor applications.

Description of Related Art

The use of polydimethylsiloxane (PDMS) microspheres has seen significant growth in the past decade due to impressive biocompatibility, chemical inertness, and unique mechanical properties of the underlying PDMS polymer. These microspheres have been used as mechanical property modifiers in bulk epoxy resins, novel vehicles for drug delivery, cell entrapment aids in acoustofluidics cells, and for mechanical, thermal, and UV signal sensing. Microspheres have also been used as a base for PDMS-based pastes with consistency suitable for stand-alone direct ink write additive manufacturing. The ability to direct 3D print PDMS structures leads to further innovations where porous PDMS structures, which includes hydrophobic gas exchange membranes in microfluidics systems, cell cultures, sensing materials, photocatalysts, and separations. Microsphere-based 3D printing could offer simpler fabrication routes in these applications, which currently rely on a solid sacrificial negative template or by bulk emulsion curing.

In each of these applications, structure porosity and/or stiffness play key roles in performance. Thus, microspheres that exhibit high porosity and low density can provide a way to tuning these properties by simply including porous microspheres as an additive. Many methods have been previously used for producing porous and hollow microspheres or emulsions with complex architecture. These including solvent evaporation, polymerization, seed swelling, sintering, phase separation, spray drying, microfluidic flow focusing, and membrane emulsification. However, many of these approaches are limited in scalability because they require specialty equipment, have low throughput, or rely on excess and expensive materials such as high levels of solvents. One attractive approach was able to successfully produce PLGA gas-blown microspheres from double emulsions by addition of ammonium bicarbonate, a species which decomposes into gaseous products as solvent is removed. PDMS systems can readily undergo gas blowing without significant additives by the dehydrogenative coupling of poly(methylhydro) siloxanes with silanols and alcohols. This route is used for producing close-celled PDMS sponges both in laboratory and industrial applications. However, the gas blowing reaction of PDMS has not been employed on the micro scale.

SUMMARY OF THE INVENTION

In one embodiment of the present invention, there is provided a method of forming porous polysiloxane microspheres. The method comprises forming a first emulsion comprising a plurality of hydrophilic droplets dispersed in a first continuous phase comprising a mixture of vinyl terminated siloxanes and hydro siloxanes. The hydrophilic droplets comprise a dehydrogenation catalyst dissolved in a first solvent. The method further comprises reacting a first portion of the hydro siloxanes with the first solvent, thereby producing a plurality of gas pockets dispersed in the first continuous phase and reinforced by crosslinked siloxane shells. The method further comprises mixing the first emulsion with a second solvent, thereby forming a second emulsion comprising a plurality of microspheres dispersed in a second continuous phase comprising the second solvent. Each of the plurality of microspheres comprises one or more of the plurality of reinforced gas pockets encapsulated by the mixture of the first continuous phase. The method further comprises polymerizing the vinyl terminated siloxanes and a second portion of the hydro siloxanes, thereby curing the mixture and forming the porous polysiloxane microspheres.

In another embodiment, there is provided a plurality of porous microspheres formed by the method above.

In another embodiment, there is provided a porous microsphere comprising one or more hydrogen gas pockets encapsulated by a cured polysiloxane resin and having a specific gravity less than about 1.0.

In another embodiment, there is provided a material comprising a plurality of the porous microspheres above contained within a cured polymer resin.

In another embodiment, there is provided a method for producing an article using the microspheres above. The method comprises mixing a plurality of the porous microspheres with a liquid polymer precursor, thereby forming a printable ink, depositing one or more layers of the printable ink onto a substrate, and curing the liquid polymer precursor, thereby forming the article.

BRIEF DESCRIPTION OF THE DRAWINGS

Figure (FIG.) 1 is a schematic of an exemplary process of forming a double emulsion and resulting microspheres according to one embodiment of the present invention.

DETAILED DESCRIPTION

Embodiments of the present invention are generally directed to porous microspheres, methods of forming the porous microspheres, and applications for using the porous microspheres. Although the microparticles formed by the methods described herein are generally referred to "microspheres," it will be understood that these microsphere particles may geometries that are not perfectly spherical, including asymmetrical geometries. Thus, the term "microspheres" used herein may also be referred to more generally as "microsponges," and these terms may be used interchangeably. The microspheres (or microsponges) produced according to embodiments of the present invention may generally be characterized as polysiloxane (e.g., silicone rubber) spheres having pockets of entrapped gas contained therein. As described herein, the pockets of gas may be produced by a dehydrogenation reaction that occurs at emulsion phase interfaces during the production of the microspheres. The resulting microspheres may be more porous and have lower density than microspheres produced using prior methods.

Figure 1:
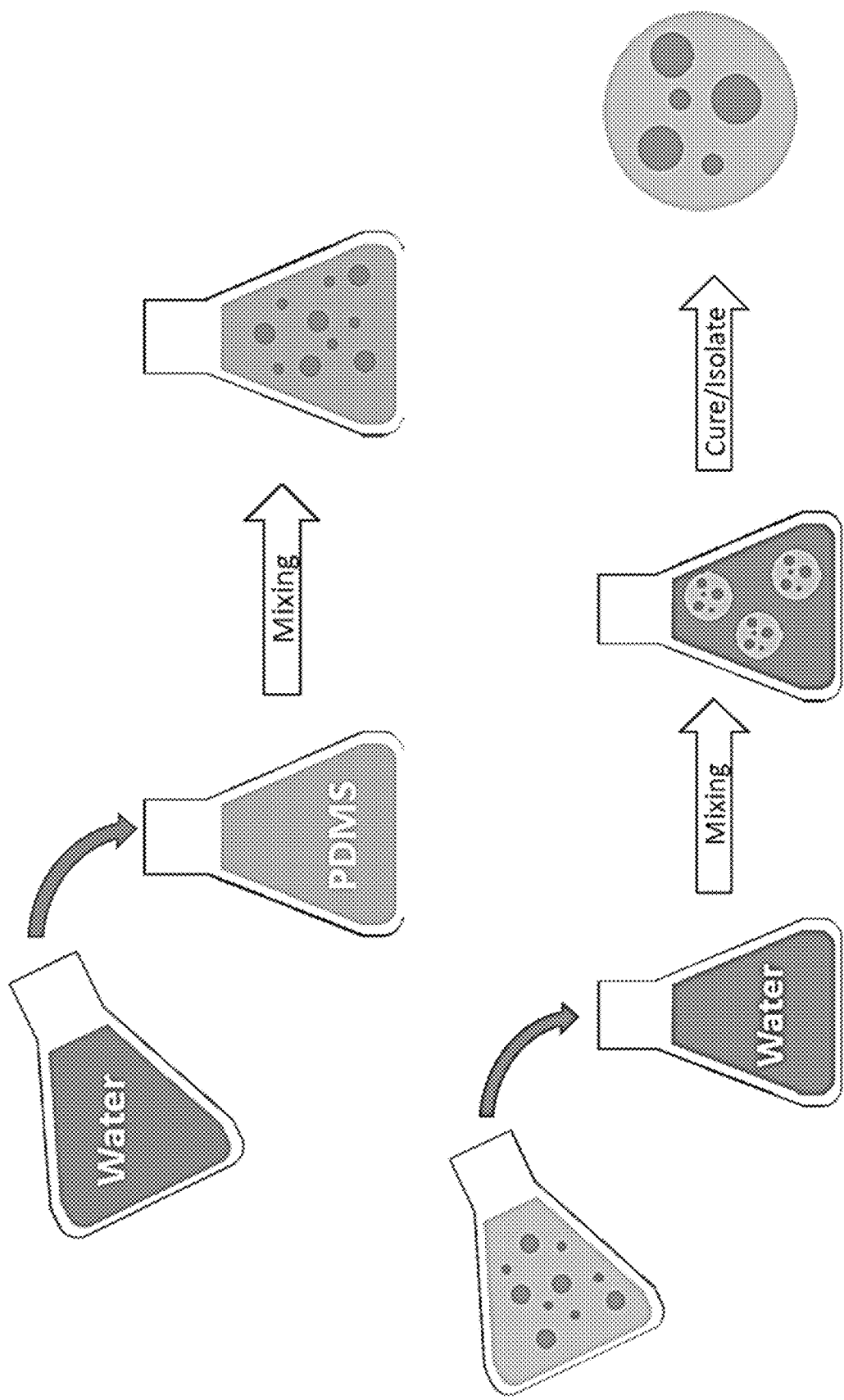
Figure 2:
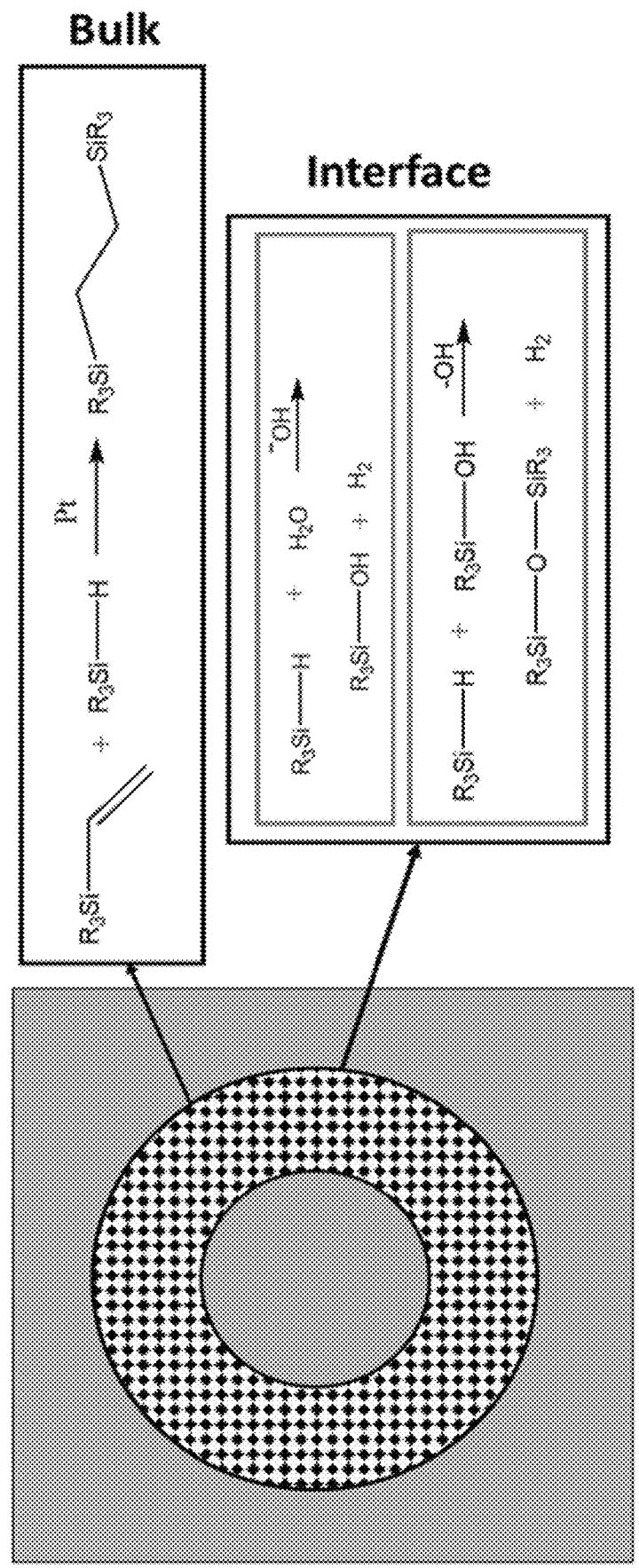
FIG. 2 is a schematic summary of interfacial polymerization for stabilizing PDMS double emulsions and producing blowing $H_2$ gas according to one embodiment of the present invention.

FIGS. 1 and 2 schematically depict an exemplary method of forming the porous polysiloxane microspheres. Although these figures depict an embodiment wherein the first and second solvents comprise water and the polysiloxane is PDMS, it will be understood that other types of solvents and polysiloxanes may also be used in accordance with embodiments of the present invention. Additionally, although the emulsions and double emulsions may be referenced herein as water-in-oil (W/O) and water-in-oil-in-water (W/O/W), respectively, it will be understood that the "water" phase may comprise partially, or entirely, of hydrophilic species other than water.

As depicted, the method generally comprises forming a first emulsion comprising a plurality of hydrophilic droplets as the dispersed phased, which are dispersed in a first continuous phase comprising a siloxane-containing liquid mixture. The dispersed phase (hydrophilic droplets) generally comprises a dehydrogenation catalyst dissolved in a first solvent. The siloxane-containing liquid mixture generally comprises vinyl terminated siloxanes and hydrosiloxanes. As best shown in FIG. 2, due to the presence of the dehydrogenation catalyst in the droplets, a portion of the hydro siloxanes react with the first solvent at the interface of the phases. The dehydrogenation reaction results in the formation of a plurality of hydrogen gas bubbles dispersed in the first continuous phase while simultaneously crosslinking the hydrosiloxanes at the interface to produce reinforced shells providing structural support for the gas bubbles.

The first emulsion is then mixed with a second solvent to form a second emulsion. The second emulsion generally comprises a plurality of microspheres as the dispersed phase, which is dispersed in second continuous phase comprising the second solvent. The microspheres in the dispersed phase generally comprise one or more of the plurality of reinforced gas bubbles encapsulated by the siloxane-containing mixture of the first continuous phase. As best shown in FIG. 2, at least a portion of the remaining hydro siloxanes and the vinyl terminated siloxanes from the first continuous phase are polymerized, optionally in the presence of a metal catalyst, heat, and/or UV radiation. The polymerizing cures the mixture of the first continuous phase and forms the resulting porous polysiloxane microspheres. The microspheres may then be washed, filtered, and/or otherwise removed for isolated from the solvent of the second continuous phase.

First Emulsion

The hydrophilic dispersed phase (droplets) generally comprises a polar solvent as the primary component and a dehydrogenation catalyst dissolved therein. In certain embodiments, the solvent is a polar solvent selected from the group consisting of water, methanol, ethanol, isopropanol, dimethyl sulfoxide, and mixtures thereof. In certain preferred embodiments, the first solvent comprises water as the primary component, optionally mixed with one or more alcohols as secondary solvent components.

The dehydrogenation catalyst generally comprises a strong base, which will completely dissociate in the selected first solvent. In certain embodiments, the dehydrogenation catalyst comprises one or more hydroxide compounds. In certain embodiments, the one or more hydroxide compounds are selected from the group consisting of potassium hydroxide, tetramethyl ammonium hydroxide, sodium hydroxide, tetrabutyl phosphonium hydroxide, and mixtures thereof, although it will be understood that a variety of other hydroxide compounds may also be used. The dehydrogenation catalyst is generally dissolved in the solvent at a concentration of about 0.1% to about 10%, about 0.5% to about 8%, or about 1% to about 5% by weight, with the total weight of the hydrophilic dispersed phase taken as 100% by weight.

In certain embodiments, the hydrophilic dispersed phase may further comprise a hydrophilic and/or non-surfactant additive. Such additives may impart beneficial effects upon the hydrogen release rate during the dehydrogenation reaction, such as increasing the release rate and reducing the amount of dehydrogenation catalyst required. In certain embodiments, the additive is selected from the group consisting of polyethylene glycol, glycerol, and mixtures thereof. In certain such embodiments, the additive comprises a high molecular weight polyethylene glycol having a weight average molecular weight of at least about 400, at least about 1500, or at least about 8000. In certain embodiments, the additive is included at a concentration of about 0.1% to about 40%, about 1% to about 30%, or about 2% to about 20% by weight, with the total weight of the hydrophilic dispersed phase taken as 100% by weight.

The first continuous phase generally comprises the siloxane-containing liquid mixture of vinyl terminated siloxanes and hydrosiloxanes (i.e., Si-H containing species) as the primary component. In certain embodiments, the vinyl terminated siloxanes comprises vinyl terminated polydimethylsiloxane. In certain embodiments, the hydrosiloxanes comprise methylhydrosiloxane. The vinyl terminated siloxanes and hydrosiloxanes may be provided as separate components that are mixed or as a single product (i.e., comprising a pre-packaged mixture), and may also be in the form of copolymers with other siloxanes. In certain embodiments, the mixture comprises vinyl terminated siloxanes and hydro siloxanes at a ratio of about 2:1 to about 20:1

In certain embodiments, the first continuous phase may further comprise a surfactant. In certain embodiments, the surfactant is a silicone emulsifier. In certain embodiments, the surfactant is included at a concentration of about 0.1% to about 10%, about 1% to about 8%, or about 2% to about 5% by weight, with the total weight of the first continuous phase taken as 100% by weight.

The hydrophilic dispersed phase may be prepared by dissolving the dehydrogenation catalyst in the solvent and adding any desired hydrophilic additives. The prepared solution can then be combined with the siloxane-containing mixture to form the first emulsion. In certain embodiments, the solution may be added in bulk to the siloxane-containing mixture and emulsified in a vortex mixer or other mixing device. In certain other embodiments, the solution and mixture can be combined and fed through a homogenizing valve, orifice, or high shear nozzle to form the resulting emulsion. In certain embodiments, the combination is fed through the valve, orifice, or nozzle at a rate of about 1 ml/s to about 10 ml/s, or about 5 ml/s to about 7 ml/s, although faster and slower flow rates may also be used.

In certain embodiments, the resulting emulsion comprises a volume ratio of the siloxane-containing mixture to the hydrophilic dispersed phase (droplets) of about 1:1 to about 10:1, about 2:1 to about 8:1, or about 3:1 to about 5:1. In certain embodiments, the emulsion is then allowed to rest for a period of about 1 minute to about 60 minutes, about 5 minutes to about 30 minutes, or about 10 minutes to about 20 minutes, thereby allowing the dehydrogenation reaction to commence and form the hydrogen gas bubbles/pockets and crosslinked shells.

Second Emulsion

As noted above, the second emulsion is generally formed by combining the first emulsion with a second solvent. In certain embodiments, the resulting second emulsion comprises a volume ratio of the first emulsion to the second solvent of about 2:1 to about 20:1, about 3:1 to about 15:1, or about 5:1 to about 10:1. The second emulsion generally comprises a plurality of microspheres as the dispersed phase and the second solvent as the second continuous phase. The microspheres generally comprise one or more of the plurality of reinforced gas bubbles, resulting from the dehydrogenation reaction, which are encapsulated by the unreacted siloxane-containing mixture of the first continuous phase.

The second solvent may comprise the same or different components as the dispersed solvent phase from the first emulsion, although the second solvent will generally not include the dehydrogenation catalyst. In certain embodiments, the second solvent is a polar solvent selected from the group consisting of water, methanol, ethanol, isopropanol, dimethyl sulfoxide, and mixtures thereof. In certain preferred embodiments, the first solvent comprises water as the primary component, optionally mixed with one or more alcohols as secondary solvent components.

In certain embodiments, a metal catalyst may be added to the first emulsion and/or second emulsion to promote curing of the unreacted siloxane-containing mixture. For example, in certain embodiments, the metal catalyst may be added to the first emulsion after the resting period but before combining with the second solvent. In certain same or other embodiments, the metal catalyst is included in a commercially provided siloxane-mixture product. In certain same or other embodiments, the metal catalyst may be added concurrently when combining the first emulsion and the second solvent to form the second emulsion. In certain embodiments, the metal catalyst is a platinum-based catalyst. In certain embodiments, the metal catalyst is trimethyl (methylcyclopentadienyl) platinum(IV). In certain embodiments, the metal catalyst is added at a volume ratio with the first continuous phase siloxane-containing liquid mixture) of about 1:500 to about 1:10,000, or about 1:1,000 to about 1:5,000, metal catalyst: first continuous phase.

In certain embodiments, the second continuous phase (including the second solvent as the primary component) may further comprise a surfactant, which may aid in formation of the second emulsion. In certain embodiments, the surfactant may be added to the second solvent prior to combining the first emulsion with the second solvent. In certain embodiments, the surfactant may be a nonionic surfactant. In certain embodiments, the surfactant is selected from the group consisting of poloxamers, polysorbates, polyvinyl alcohols, and mixtures thereof. In certain embodiments, the surfactant is included at a concentration of about 0.1% to about 10%, about 1% to about 8%, or about 2% to about 5% by weight, with the total weight of the second continuous phase taken as 100% by weight.

Upon formation of the second emulsion, the siloxane-containing mixture of the microspheres may be cured to form the final porous polysiloxane microspheres. The curing is a result of polymerization of the unreacted vinyl terminated siloxanes and hydrosiloxanes, which may be promoted by the addition of the metal catalyst, application of heat, and/or application of UV radiation. The cured microspheres may then be recovered from the second emulsion through various processing steps, such as filtering and/or density separation. Washing and/or drying may also be included as optional post-processing steps.

Porous Polysiloxane Microspheres (or Microsponges)

The porous polysiloxane microspheres (or microsponges) formed according to embodiments of the present invention generally comprise one or more gas pockets encapsulated within a cured polysiloxane structure. The microspheres generally exhibit greater resiliency and lower density as compared to traditional, solid (non-porous) microspheres or other gas-blown microspheres formed using existing techniques. In certain embodiments, the microspheres may be characterized as close-celled foams. In certain embodiments, the microspheres comprise a void fraction (porosity) of at least about 1%, at least 5%, at least about 10%, at least about 15%, at least about 20%, at least about 30%, at least about 40%, or at least about 50%. In certain embodiments, the microspheres comprise a void fraction (porosity) of about 1% to about 60%, or about 5% to about 50%. In certain embodiments, the microspheres have a specific gravity (bulk density) of less than about 1.0, less than about 0.95, or less than about 0.90. In certain embodiments, the microspheres have an average diameter (or average longest lateral dimension) of about 1 μm to about 1000 μm, about 20 μm to about 600 μm, or about 50 μm to about 400 μm.

Applications

Figure 3:
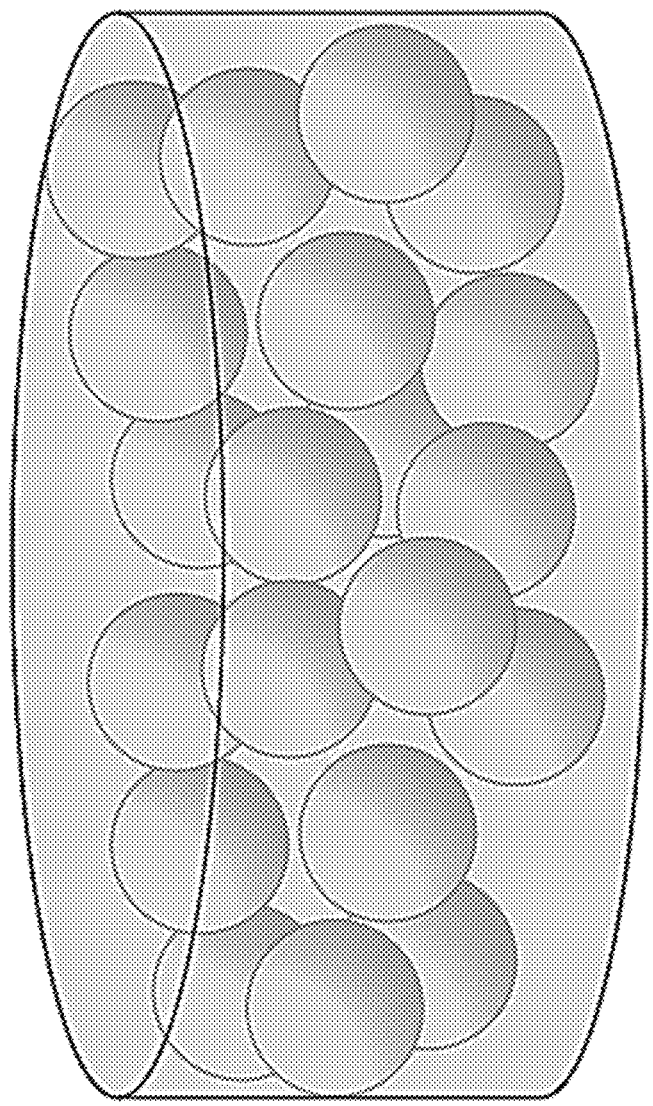
FIG. 3 is a construct material comprising microspheres contained within a polymer resin according to one embodiment of the present invention.

The low density, high porosity polysiloxane microspheres according to embodiments of the present invention have a variety of industrial and laboratory applications. In particular, the microspheres can be used as fillers in the manufacture of resilient and/or low-density materials. For example, in certain embodiments, a material may be produced comprising a plurality of the porous microspheres contained within a cured polymer resin. An exemplary material construct is shown in FIG. 3. To produce the material, the microspheres may be dispersed within a liquid polymer precursor, and the precursor is then cured to form the material. In certain embodiments, the materials include the microspheres at a concentration of about 10% to about 80%, or about 25% to about 75%, or about 40% to about 66%, by weight, with the total weight of the material taken as 100% by weight. In certain embodiments, the material comprises a void fraction (porosity) of about 5% to about 60%, or about 10% to about 50%. The materials are particularly useful in sensors and composites applications.

The microspheres according to embodiments of the present invention may be particularly useful in additive manufacturing (e.g., 3-D printing) applications. For example, the microspheres may be used in a method of producing a printed article. The method generally comprises mixing a plurality of the porous microspheres with a liquid polymer precursor, thereby forming a printable ink. The ink is then deposited through a nozzle or other device into one or more layers onto a substrate. The liquid polymer is then cured (e.g., crosslinked), for example, by catalyst, heat, and/or UV exposure, to form the resulting printed article.

Figure 5:
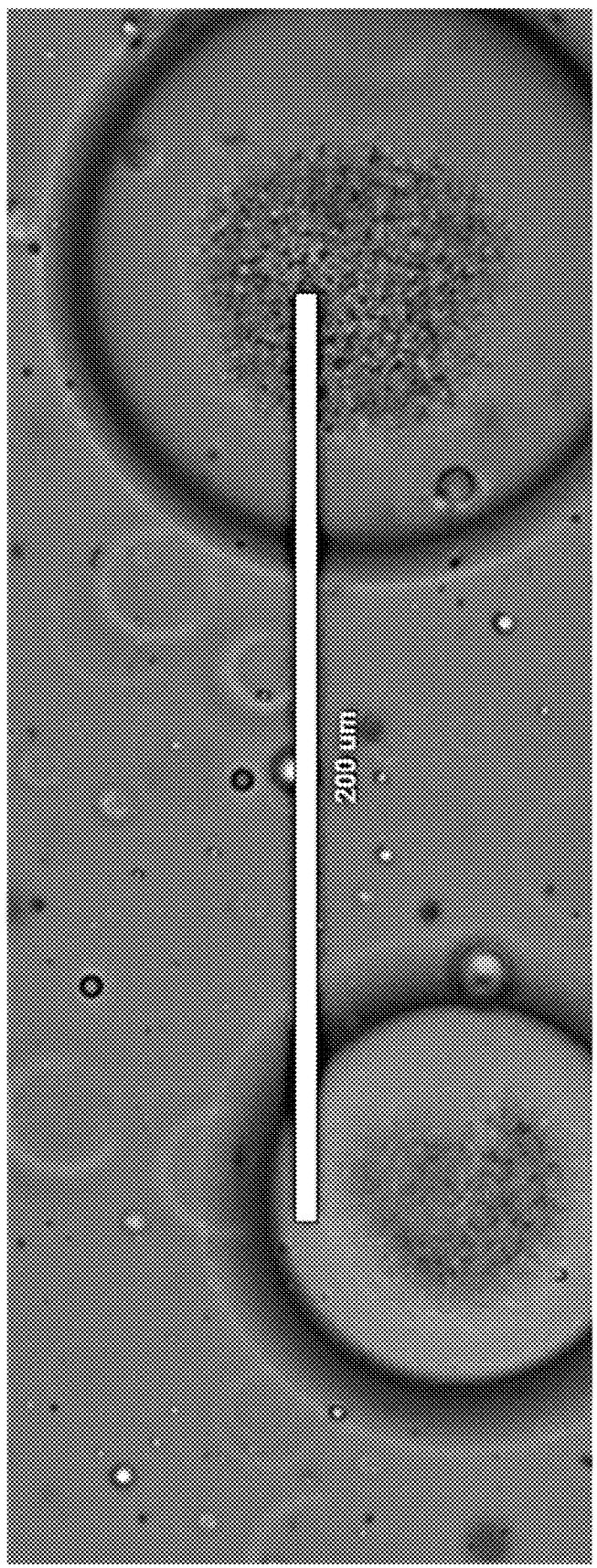
FIG. 5 is an image of microspheres made from the traditional process using metal salt cured blown silicones showing little gas phase entrapment.

The methods and microspheres according to embodiments of the present invention have a number of advantages. For example, in certain embodiments, the method utilizes two catalyst reactions, which effectively decouples the hydrogen release reaction and the silicone curing reaction. This improves gas capture ability compared to single-catalyst "blown silicones." Additionally, the dehydrogenation reaction stabilizes the inner interface of the W/O/W emulsion, thereby simplifying scaling of the manufacture process. This provides for better yield in high shear environments. Moreover, embodiments of the present invention require less water/solvent added to the initial W/O emulsion. This is because volume is generated in-situ by the gas reaction during curing. This also reduces viscosity of the original W/O mixture, which makes processing easier. These advantages are particularly superior to traditional gas-blown silicones (i.e., metal salt cure), which make silicone foams but do not trap gas well on very small scales. See FIG. 5. The resulting microspheres are advantageously chemically inert, biocompatible, and/or stable in extreme temperatures.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLE

The following example sets forth methods in accordance with embodiments of the invention. It is to be understood, however, that this example is provided by way of illustration, and nothing therein should be taken as a limitation upon the overall scope of the invention.

In this example, porous gas-blown PDMS microspheres were produced, which may be used as a low-density, low-stiffness PDMS filler. A modified water-in-oil-in-water (W/O/W) double emulsion architecture was used as a way to decouple the PDMS curing reaction from a hydrogen blowing reaction, allowing for high levels of gas capture on the micron scale. Potassium hydroxide catalyst in the inner water phase promoted the evolution of hydrogen gas from poly(methylhydro)siloxanes at the inner W/O interface, which was then trapped in the bulk PDMS phase as gas domains. Addition of an additive (e.g., PEG8000) to the inner water phase significantly improved reactivity and emulsion stability. High molecular weight and silanol containing species at the inner W/O interface were used as emulsifying agents. Produced microspheres could be readily isolated from solution, dried, and stored for future use. Constructs made from the porous microspheres and liquid polysiloxane precursor (e.g., Sylgard 184) showed an exponential relationship between elastic modulus and the weight fraction of microspheres. The constructs could be made with up to about 66 wt % porous microspheres, resulting in an elastic modulus decrease of about 93% compared to pure polysiloxane (e.g., Sylgard 184) constructs.

Introduction

As described herein, highly porous PDMS microspheres were produced by decoupling the hydrogen blowing reaction of poly(methylhydro) siloxane from the curing reaction of the bulk PDMS phase in a microsphere. A water-in-oil-in-water (W/O/W) emulsion architecture was used, in which the dehydrogenation reaction at the inner water-oil interface was promoted by a water-soluble base catalyst. In addition to gas production, the interface reaction aids in architecture stabilization by producing crosslinks and high molecular weight silanol species, an effect similar to interfacial reactions used to stable core-shell encapsulations. This method also improves upon microsphere production from W/O/W emulsions alone by simplifying fabrication, since high infill W/O emulsions need slow addition of water and experience significant increases in viscosity. Instead, producing gas after the W/O/W architecture was established produced porous structures, but with much lower water infills of the W/O emulsion.

A schematic for the initial emulsion architecture is shown in FIG. 2. The bulk PDMS phase contains methylhydro and vinyl functionalized polysiloxanes, which are used as thermoset PDMS elastomers. Base catalyzed dehydrogenation occurs at the inner W/O interface, where gas is trapped in the curing rubber matrix. Screening trials of the internal water phase found optimal formulation conditions, which was used for batch production of porous microspheres from Sylgard 184, a common two-part silicone resin.

Materials and Methods

Table 1 lists the variety of polysiloxanes, surfactants, solvents, and non-surfactant materials used in this study.

TABLE 1

Materials used for porous PDMS microsphere fabrication.

| Polysiloxanes | Surfactants | Solvents | Non-surfactant additives |
|---|---|---|---|
| DMS-V21[a] | Tween 80[d] | Methanol[c] | PEG200[h] |
| DMS-V31[a] | Poloxamer F68[e] | Ethanol[d] | PEG400[e] |
| HMS-301[a] | Poloxamer F123[e] | Isopropanol[g] | PEG1500[i] |
| Sylgard 184[b] | Dowsil ES5600[b] | DMSO[c] | PEG8000[d] |

TABLE 1-continued

Materials used for porous PDMS microsphere fabrication.

| Polysiloxanes | Surfactants | Solvents | Non-surfactant additives |
|---|---|---|---|
| Silanol terminate PDMS (65 cSt)[c] | Dowsil ES5300[b] 100% hydrolyzed PVA[f] | Water | Glycerol[e] |

Materials sourced from
[a]Gelest
[b]Dow chemical
[c]Sigma-Aldrich
[d]Fisher
[e]Spectrum
[f]Acros
[g]Swan
[h]Alfa Aesar
[i]Fluka.

PDMS microspheres were produced by vinyl addition reaction between vinyl terminated PDMS and methylhydro siloxanes. SIP6830.3 and SIP6832.2 (Gelest) thermally activated and trimethyl (methylcyclopentadienyl) platinum(IV) (Sigma) UV activated platinum catalysts were used to complete the crosslinking reaction in screening studies.

Potassium hydroxide from pellets (>85% purity, 10-15 wt % water; Sigma) were used as the dehydrogenation catalyst and were dissolved into the inner hydrophilic phase.

The procedure for screening tests was as follows. Liquid PDMS mixtures were made with 8:1 volume ratio of DMS-V21 or DMS-V31 to HMS-301. Silicone emulsifiers (Dowsil ES5300 and ES5600) were added in amounts from 0-8 wt % of the siloxane phase. PDMS and the hydrophilic phase were emulsified in a 3:1 volume ratio in a 1.5 mL centrifuge tube using a vortex mixer followed by a resting period of 10 minutes with intermittent mixing to allow the interface stabilizing reaction to proceed. Following the resting period, diluted platinum catalyst SIP6830.3 in DMS-V21 was added at ⅓ the initial PDMS phase volume. The final hydrophilic phase constituted 20 vol % of the emulsion. Once the catalyst was added, the entire emulsion was immediately added to 5 mL of 2-2.5 wt % PVA (88% hydrolyzed, 145-186 kDa) aqueous solution as the outer aqueous phase and emulsified using a vortex mixer. Emulsions were viewed under a brightfield microscope to evaluate double emulsion retention and reactivity at the inner water-oil interface was qualitatively assessed by monitoring hydrogen release rate. Fluorescein was used to tag the inner hydrophilic phase for microscopy imaging.

Once a final formulation was established, microspheres made of Sylgard 184 were produced for mechanical testing of porous-bead containing constructs; a base:curing agent ratio of 10:1 was used in accordance with manufacturer's recommendations. Porous microspheres were fabricated using a modification of the double syringe method described by Choi et al. and Lopez et al. Two luer lock syringes were connected with a 1 mm orifice between them and loaded with a 3:1 volume ratio of PDMS phase to the inner water phase. The materials were continuously pushed through the orifice for two minutes at high speed to produce the initial W/O emulsion. As before, the emulsion was allowed a resting period of 10 minutes to improve interface stability. After the rest period, the W/O emulsion was mixed into 1 wt % PVA, 2 wt % Tween 80 surfactant solution as the outer water phase. A 10× the volume amount of the outer water phase was used in relation to the volume of original PDMS. To form the W/O/W emulsion, the mixture of the surfactant solution and the original W/O emulsion were forced through the orifice for two minutes at a rate of approximately 6 ml/s to prevent significant emulsion breakage. The final emulsion was thermally and/or UV cured, filtered from solution, and rinsed with DI water a minimum of 10× before drying in an oven at 150° C.

Results and Discussion

Formulation of the Internal Phase

Selection of the internal hydrophilic phase composition can be an optimization of cost, reactivity, safety, and efficiency. Hydrogen release rate in the original W/O emulsion was strongly correlated with the hydrogen donor ability of the hydrophilic solvent. For example, systems using mixtures of DMSO and PEG additives required only a fraction of a percent of KOH catalyst to slow hydrogen release to a controllable rate. A higher reaction rate is important for rapid formation of high MW compounds at the interface that help stabilize the W/O emulsion, as well as for minimizing the amount of hydroxide catalyst needed. Despite higher reactivity, DMSO, ethanol, and isopropanol could not form stable emulsions even with high levels of PEG and glycerol additives. Methanol was able to form emulsions stable on the order of tens of minutes when mixed in high concentrations of PEG400 with KOH loadings of 1-5 wt %, but emulsion stability was significantly less than water-based solutions. Using water/alcohol mixtures of up to 10% alcohol formed stable emulsions with low surface tension but improvements to reactivity were not significantly. Overall, water as a primary solvent provided the most stable W/O emulsion, but the high degree of hydrogen bonding with the KOH led to limited hydrogen release rates which led to limited amounts of in-situ surfactant formation.

TABLE 2

Hydrogen bonding abilities of solvents.

| Solvent | Donor Ability [α] | Acceptor Ability [β] |
|---|---|---|
| Water | 1.17 | 0.47 |
| Methanol | 0.93 | 0.66 |
| Ethanol | 0.83 | 0.75 |
| Isopropanol | 0.76 | 0.84 |
| DMSO | 0.00 | 0.76 |

Non-surfactant additives each contain multiple reactive hydroxyl groups and were added to provide materials that could possibly react with available Si—H bonds at the W/O interface to form siloxy surfactants and networks. In the case of DMSO as the inner hydrophilic phase solvent, they provide the only available hydroxyl groups for the hydrogen evolution reaction. PEG was found to be a good additive for significantly increasing reactivity to a point that offset the sluggish reactivity of water-base formulations. Higher molecular weight PEGs were also found to form more stable W/O emulsions as well as having higher observable rates of hydrogen evolution than lower MW PEG. This effect is likely caused by the lower hydrophilicity of the ester backbone compared to the hydroxyl terminals leading to better mobility of higher MW PEGs to the W/O interface. Although not intended to be bound by any theories, the improvement by addition of PEG is likely caused by several mechanisms. First, PEG may act as a phase agent for the catalyst across the W/O interface, as PEG can complex with ions. PEG may also be working as a weak surfactant or as an active reagent in the formation of PEG-siloxane copolymers, making higher MW PEGs better suited for interface coverage. Copolymers of PEG and siloxanes would behave as strong surfactants, although would be subject to hydrolysis due to the high susceptibility of the silyl ether bond in basic environments.

Glycerol as an additive generally did not improve W/O stability significantly, however a 50/25/25 vol % mixture of PEG400/glycerol/DMSO resulted in a high population of double emulsion microspheres. These double emulsions have a thick opaque outer shell tagged with fluorescein that appears significantly different from other PDMS microspheres in the same image. It is as though the shell comprised of a PEG-glycerol-PDSM copolymer network that underwent inversion during the second emulsification step with a cured PDMS core.

Surfactants were tested as a means of improving the retention of the W/O/W architecture through adsorption to the W/O interface and through possible network formation, similar to PEG and glycerol additives. Of the water-soluble surfactants added, none improved the hydrogen release rate significantly or improved general W/O stability. These surfactants also promoted formation of O/W emulsions instead of the desired W/O due to their higher HLB values. Silicone surfactants ES5300 and ES5600 are designed for W/O emulsion formulation with silicones as the oil phase and are well suited for the formation of W/O/W double emulsions in low-shear environments but increase the viscosity of the base silicone used. Addition of either of these surfactants improved W/O/W architecture retention but reduced the hydrogen release rate significantly, likely by forming an obstructing layer between the available methylhydro siloxanes and water. This effect was more severe with ES5300, and this surfactant led to difficult droplet breakup of the oil phase moved during the second emulsion process.

Addition of ES5600 is recommended for lower viscosity silicones (DMS-V21, 100 cSt), but higher viscosity silicones (DMS-V31, 1000 cSt) readily formed double emulsions by relying on polar siloxanes formed at the W/O interface and addition of a silicone-phase surfactant is optional. However, addition of ES5600 improved thermal stability when W/O/W emulsions were cured at higher temperatures.

The final recommended formulation for the inner hydrophilic phase composition is 1 wt % KOH and 2 wt % PEG8000 in water, and 3 wt % ES5600 in the silicone phase for general use. PEG and KOH concentrations can be further reduced by increasing the amount of time allowed to stabilize the interface and/or by decreasing the cure rate of the bulk silicone. It should also be noted that the identity of the hydroxide catalyst was not varied in this study. While KOH is a low cost and common option, residual hydroxide salts can be damaging to polysiloxane structures in long term use. Commercial transient catalysts such as tetramethyl ammonium hydroxide and tetrabutyl phosphonium hydroxide decompose at moderate temperatures, making them an attractive option that removes residual system ions. The cations of these species also have higher partition coefficients that would further improve reactivity and reduce the required hydroxide concentration.

Comparison to Blown Silicones

Figure 4A:
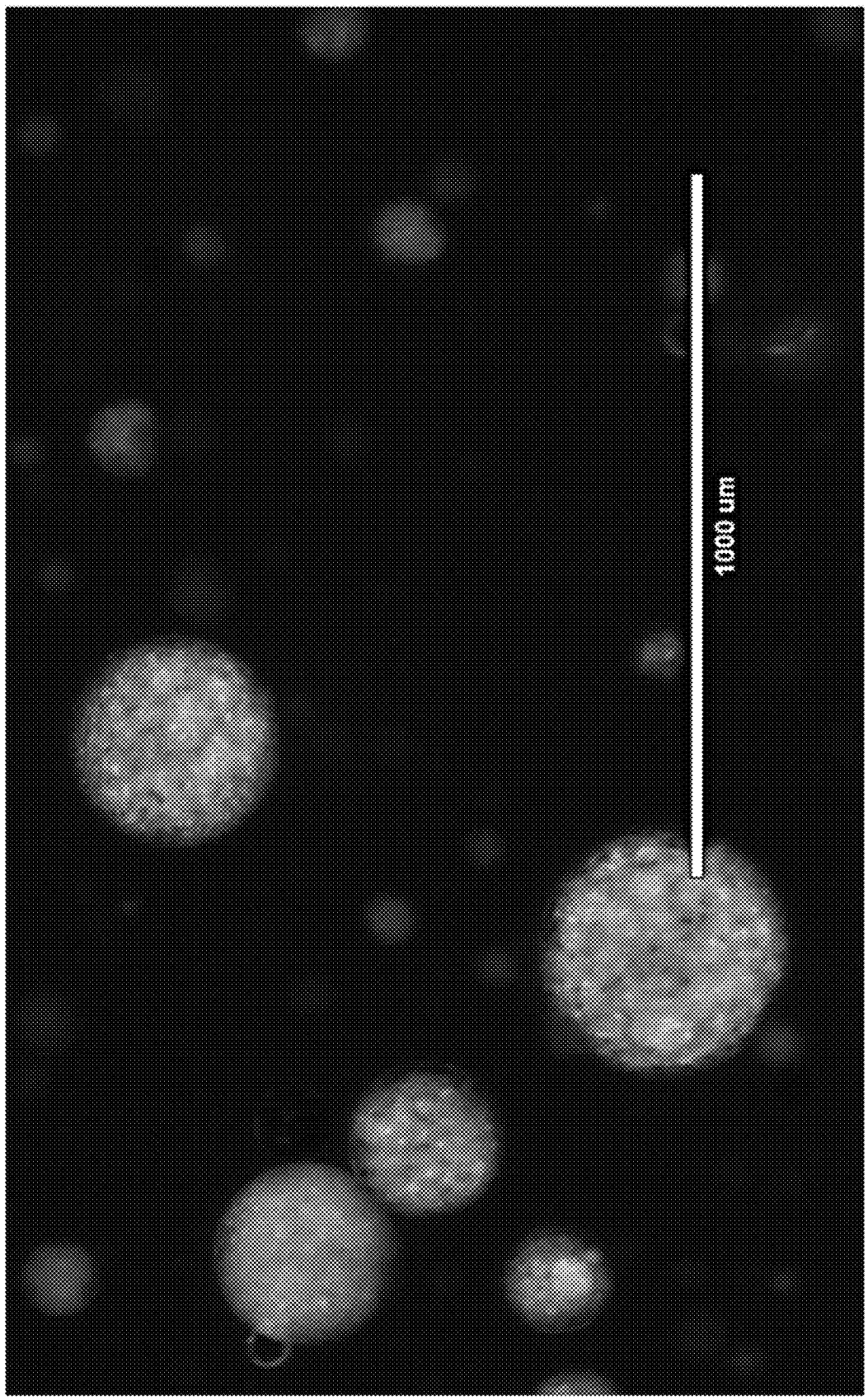
FIG. 4A is an image of a fluorescein tagged porous microspheres from screening trials, wherein the inner hydrophilic phase comprises 1 wt % KOH, 29 wt % PEG400, 70 wt % MeOH with fluorescein.
Figure 4B:
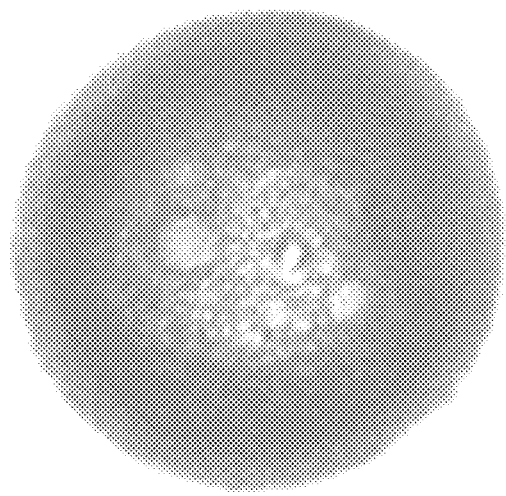
FIG. 4B is an image of an isolated Sylgard 184 porous microsphere with highly porous structure formed by two-step curing process.
Figure 4B:

The proposed method was compared to the performance of traditional metal salt cure silicones, which produce $H_2$ blown structures from the dehydrogenation of silanols and methylhydro siloxanes. Silanol-terminated PDMS (65 cSt) and HMS-301 were mixed in 2:1 ratio with tin(II) 2-ethylhexanoate at 2 wt % as catalyst. The PDMS mixture was emulsified in 2 wt % PVA using a vortex and cured at 60° C. Unlike the highly porous structures in FIGS. 4A and 4B, metal salt cured microspheres showed little gas entrapment except in minor amounts around the microsphere core (see FIG. 5). This effect highlights the benefits of the proposed method, which decouples gas production from the curing reaction.

Mechanical Properties of Porous Microsphere-Based Constructs

Porous microspheres for mechanical testing were made in high throughput batches using Sylgard 184 as the chosen silicone. Sylgard 184 was chosen over DMS-V21 and DMS-V31 due to its wide use in literature and that it contains silica additive, which reduces material brittleness. Although the base component of the Sylgard kit contains a pre-mixed thermally active Pt catalyst, trimethyl (methylcyclopentadienyl) platinum(IV) UV active catalyst was added at 0.01 wt %. Best results for high gas entrapment were achieved by curing W/O/W emulsion in a two-step process: a partial cure under UV light was done for 20 minutes followed by heating at 75° C. for 2 hours. Inclusion of the UV step reduced droplet agglomeration and improved gas entrapment by increasing the silicone phase viscosity. High levels of gas entrapment are clearly visible in FIG. 4A and led to the majority of microspheres becoming less dense than water. For reference, Sylgard 184 has a bulk specific gravity of 1.05. Typical diameters from brightfield imaging ranged from 50-400 µm.

Constructs for mechanical testing were made by mixing various ratios of porous Sylgard microspheres with liquid Sylgard 184 followed by thermal curing at 60° C. for 3 hours. At high volume fractions of microspheres, the liquid Sylgard forms capillary bridges between microspheres, rather than full encapsulation. Mechanically stable constructs could be made with as high as 66 wt % microspheres, with higher levels having poor bridging between microspheres that made the constructs too fragile to handle. After curing, constructs were cut into a cylindrical shape using a standard 10 mm biopsy punch. Dimensions of each construct were measured using a micrometer for estimation of bulk density, which showed a nonlinear relationship with the weight fraction of microspheres added. Without being bound by any theories, this is likely because porosity comes internally from the microsphere structure as well as externally from pores between adjacent microspheres.

Figure 6A:
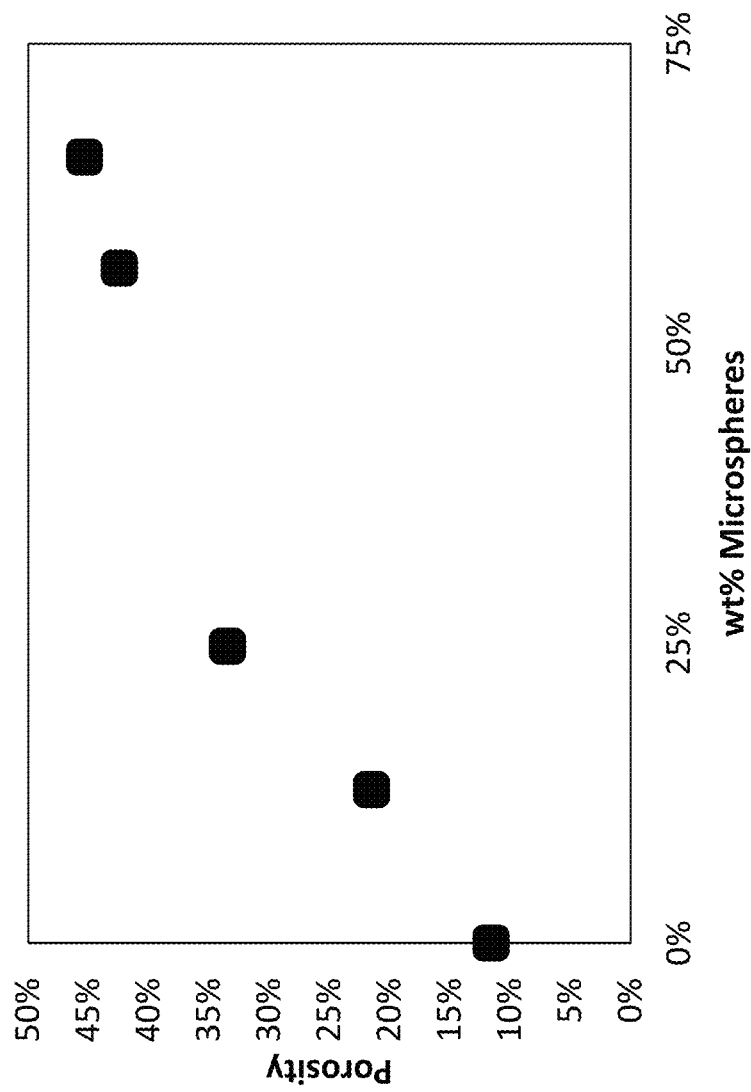
FIG. 6A is a graph showing the weight fraction of microspheres versus estimated construct porosity.
Figure 6B:
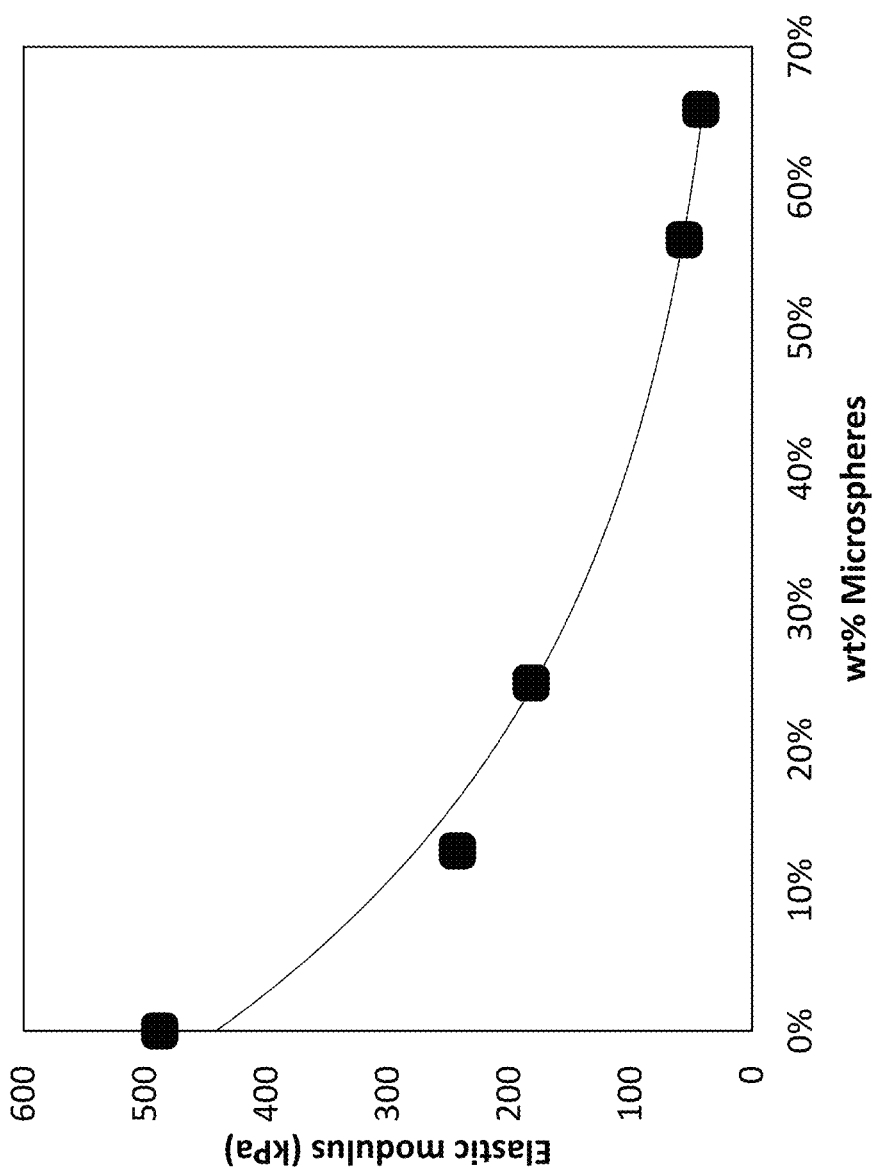
FIG. 6B is a graph showing the weight fraction of microspheres versus measured Young's modulus.

Mechanical properties of each sample were analyzed using an Electroforce 5500 (TA Instruments, New Castle, Del). The results are graphed in FIGS. 6A and 6B. Young's modulus of constructs has an exponential relationship with weight fraction of microspheres used in the construction and a linear relationship with estimated sample density. A maximum reduction of 93% was seen in the Young's modulus for the construct consisting of 66 wt % porous microspheres, highlighting the ability for these filler materials to provide changes to mechanical propertied across a full order of magnitude. The reduction in construct stiffness with increasing microsphere addition could further be improved by adjusting crosslink density of the silicone phase or by taking advantage of the effects of curing temperature on Sylgard 184's mechanical properties.

Conclusions

An approach for the fabrication of highly porous PDMS microspheres has been presented herein. Leverage of dehydrogenative coupling of methylhydro siloxanes with hydroxyl and silanol groups at the inner W/O interface of W/O/W double emulsions was used to produce $H_2$ gas. As the PDMS cured by Pt catalyzed vinyl addition, pockets of gas became trapped to produce a low density, high porosity microsphere structure. Optimization of the internal water phase found that 1 wt % KOH and 2 wt % PEG8000 in water performed best, with the original W/O emulsion having a 1:3 volume ratio of inner water phase to outer PDMS phase. In addition to the high level of infill, it was found that in situ produced silanols and high molecular weight networks at the inner interface could sufficiently stabilize the initial W/O emulsion with no additional surfactant necessary when high viscosity PDMS was used.

The double-reactive porous microspheres were able to be fabricated in a high-throughput batches using the double syringe approach. Microspheres made of Sylgard 184 demonstrated low density and stiffness and were capable of producing constructs with significantly reduced stiffness, highlighting this method as an attractive way to produce low density, high porosity fillers for composite materials.

The invention claimed is:

1. A method of forming porous polysiloxane microspheres, the method comprising:
    forming a first emulsion comprising a plurality of hydrophilic droplets dispersed in a first continuous phase comprising a mixture of vinyl terminated siloxanes and hydro siloxanes, the hydrophilic droplets comprising a dehydrogenation catalyst dissolved in a first solvent,
    reacting a first portion of the hydro siloxanes with the first solvent, thereby producing a plurality of gas pockets dispersed in the first continuous phase and reinforced by crosslinked siloxane shells;
    mixing the first emulsion with a second solvent, thereby forming a second emulsion comprising a plurality of microspheres dispersed in a second continuous phase comprising the second solvent, each of the plurality of microspheres comprising one or more of the plurality of reinforced gas pockets encapsulated by the mixture of the first continuous phase; and
    polymerizing the vinyl terminated siloxane and a second portion of the hydro siloxane, thereby curing the mixture and forming the porous polysiloxane microspheres.

2. The method of claim 1, wherein the dehydrogenation catalyst comprises one or more hydroxide compounds.

3. The method of claim 2, wherein the one or more hydroxide compounds are selected from the group consisting of potassium hydroxide, tetramethyl ammonium hydroxide, sodium hydroxide, tetrabutyl phosphonium hydroxide, and mixtures thereof.

4. The method of claim 1, wherein the first emulsion comprises a volume ratio of the mixture to the droplets of about 1:1 to about 10:1.

5. The method of claim 1, wherein the second emulsion comprises a volume ratio of the first emulsion to the second solvent of about 2:1 to about 20:1.

6. The method of claim 1, wherein the first continuous phase further comprises an emulsifier.

7. The method of claim 1, wherein the second continuous phase further comprises a surfactant.

8. The method of claim 1, wherein the droplets comprise an additive selected from the group consisting of polyethylene glycol, glycerol, and mixtures thereof.

9. The method of claim 1, further comprising, after the reacting, introducing a metal catalyst to the first emulsion and/or the second emulsion.

10. The method of claim 9, wherein the metal catalyst comprises a platinum-based catalyst.

11. The method of claim 1, further comprising applying heat and/or UV radiation to the second emulsion to promote the polymerizing of the vinyl terminated siloxanes and the second portion of the hydro siloxanes.

12. The method of claim 1, wherein the mixture comprises vinyl terminated siloxanes and hydro siloxanes at a ratio of about 2:1 to about 20:1.

13. The method of claim 1, wherein the vinyl terminated siloxanes comprise vinyl terminated polydimethylsiloxane and/or wherein the hydro siloxanes comprise methylhydrosiloxane.

14. The method of claim 1, wherein the first solvent and/or second solvent comprises a polar solvent.

15. The method of claim 14, wherein the first solvent and/or second solvent comprises a polar solvent selected from the group consisting of water, methanol, ethanol, isopropanol, dimethyl sulfoxide, and mixtures thereof.

16. A plurality of porous microspheres formed by the method of claim 1.

17. A porous microsphere comprising one or more hydrogen gas pockets encapsulated by a cured polysiloxane resin and having a void fraction of at least about 1%.

18. A material comprising a plurality of the porous microspheres of claim 17 contained within a cured polymer resin.

19. The material of claim 18, wherein the porous microspheres are present in the material at a concentration of about 10% to about 80% by weight and/or wherein the material comprises a bulk void fraction of about 5% to about 60%.

20. A method for producing an article, the method comprising:
    mixing a plurality of the porous microspheres of claim 17 with a liquid polymer precursor, thereby forming a printable ink;
    depositing one or more layers of the printable ink onto a substrate; and
    curing the liquid polymer precursor, thereby forming the article.

* * * * *